United States Patent [19]
Berta

[11] Patent Number: 5,143,978
[45] Date of Patent: Sep. 1, 1992

[54] DYNAMICALLY PARTIALLY CROSSLINKED THERMOPLASTIC ELASTOMER CONTAINING POLYBUTENE-1

[75] Inventor: Dominic A. Berta, Wilmington, Del.

[73] Assignee: Himont Incorporated, Wilmington, Del.

[21] Appl. No.: 574,711

[22] Filed: Aug. 28, 1990

[51] Int. Cl.$^5$ .................. C08L 23/26; C08L 23/12; C08L 23/16
[52] U.S. Cl. ........................... 525/240; 525/193; 525/194; 525/195; 525/322
[58] Field of Search .............. 525/193, 194, 240

[56] References Cited

U.S. PATENT DOCUMENTS

| | | |
|---|---|---|
| 4,078,020 | 3/1978 | Rose et al. |
| 4,113,804 | 9/1978 | Cotten et al. |
| 4,247,652 | 1/1981 | Matsuda et al. |
| 4,650,830 | 3/1987 | Yonekura et al. |

Primary Examiner—Carman J. Seccuro, Jr.

[57] ABSTRACT

Disclosed is a dynamically partially crosslinked thermoplastic elastomer comprising a propylene polymer material, an amorphous ethylene-propylene copolymer rubber, a semi-crystalline, low density, essentially linear ethylene-propylene copolymer and a polybutene-1 polymer.

8 Claims, No Drawings

DYNAMICALLY PARTIALLY CROSSLINKED THERMOPLASTIC ELASTOMER CONTAINING POLYBUTENE-1

FIELD OF INVENTION

This invention relates to a dynamically partially cured thermoplastic elastomer and a method of making the same.

BACKGROUND OF THE INVENTION

Blends of a polybutene-1 polymer, a polyolefin and a monoolefin copolymer rubber are known. U.S. Pat. No. 4,078,020 discloses such a composition containing (a) uncured ethylene-higher alpha olefin copolymer which optionally contains up to 5% of a diene, (b) crystalline isotactic polypropylene, and (c) crystalline isotactic butene-1 homopolymer. The composition of this reference is not crosslinked.

Also known are compositions of 1-butene polymer and a cured or partially cured thermoplastic elastomer. For example, U.S. Pat. No. 4,113,804 discloses compositions comprising a butene-1 polymer and thermoplastic elastomer comprising a substantially cured (80-90%) mixture of (1) an interpolymer of ethylene, polyene and at least one monoolefin having at least 3 carbon atoms, EPDM, (2) polyethylene, and (3) optionally, at least one polymer of a monoolefin having at least 3 carbon atoms, preferably polypropylene. In U.S. Pat. No. 4,247,652 is disclosed a thermoplastic elastomer blend comprising (A) a dynamically partially cured elastomer composition comprising (i) a peroxide-curable olefin copolymer rubber, (ii) a peroxide-decomposing olefin plastic, where the sum of (i) and (ii) is 100 parts, and (iii) a peroxide-non-curable hydrocarbon rubbery material and/or (iv) mineral oil and (B) an olefin plastic. In both of these patents the butene polymer is blended with a thermoplastic elastomer composition that has been cured or partially cured before the addition of the butene-1 polymer.

U.S. Pat. No. 4,650,830 discloses dynamically partially cured thermoplastic elastomer compositions comprising (A) an amorphous ethylene/alpha-olefin copolymer and (B) a polymer selected from the group consisting of (i) a low crystalline copolymer of propylene with alpha-olefin having at least 4 carbon atoms, (ii) a homopolymer or copolymer of 1-butene or (iii) the polymer of component (i) or component (ii) with a homopolymer or copolymer of an alpha-olefin having at least 3 carbon atoms. Preferably, the partial crosslinking is effected by grafting a radical polymerizable monomer having at least two polymerizable groups.

SUMMARY OF THE INVENTION

It has been found that adding polybutene-1 to compositions thermoplastic elastomers and dynamically partially curing gives compositions having improved tensile strength, elongation and melt flow properties, and are useful in the manufacture of molded and extruded articles, such as, industrial hoses, automotive parts and sheeting.

Accordingly, the present invention provides a dynamically partially cured thermoplastic elastomer comprising, by weight, (a) 20 to 70 parts of a propylene polymer material, (b) 20 to 60 parts of amorphous ethylene-propylene copolymer rubber (EPR), (c) 8 to 30 parts of semi-crystalline, low density, essentially linear ethylene-propylene copolymer, wherein the total amount of (a)+(b)+(c) is 100 parts, and (d) 2 to 20 parts of polybutene-1 based on 100 parts of (a)+(b)+(c), wherein the ratio of polybutene-1 to component (b) is less than 0.5.

DETAILED DESCRIPTION OF THE INVENTION

Unless otherwise specified all parts and percentages are by weight in this specification.

The propylene polymer material used in the present invention as component (a) includes (i) crystalline polypropylene having an isotactic index of greater than 90%, preferably from 95 to 98%; and (ii) an ethylene propylene random copolymer having an ethylene content of up to 10%, preferably from about 1% up to about 3%, and is from about 90 to about 94% insoluble in xylene at room temperature. The propylene polymer material is present in an amount of from 20 to 70 parts, and preferably, from 30 to 50 parts.

Component (b) of the present invention is an amorphous ethylene-propylene copolymer rubber having an ethylene content of 40 to 70%. The ethylene-propylene copolymer rubber is present in amount of from 20 to 60 parts, preferably from 30 to 50 parts.

The semi-crystalline, low density, essentially linear ethylene-propylene copolymer of component (c) consist substantially of units of ethylene, greater than 90%, preferably greater than 95%, and is insoluble in xylene at room temperature. The term "semi-crystalline" as used in this application is defined as a crystallinity of from about 20 to about 60%, preferably about 25 to about 50%, as measured from the heat of fusion of (c) which is determined by differential scanning calorimetry on a 5 to 10 mg sample of (c) heated at 20° C./min. and assuming the heat of fusion of 100% crystalline polyethylene at 400° K. is 293 J/g as described in U. Gaur and B. Wunderlich, J. Phys. Chem. Ref. Data, 10 (1), 119 (1981). The percent crystallinity is calculated by dividing the heat of fusion of (c) by the heat of fusion of 100% crystalline polyethylene and multipling by 100. Component (c) is present in the amount of from 8 to 30 parts, preferably 10 to 20 parts.

The total amount of (a)+(b)+(c) in the composition of the present invention is 100 parts.

The polybutene-1 of component (d) is a crystalline isotactic polybutene having a density of from 0.914 to 0.919 g/cm$^3$, with a melt index of from 1 to 100 g/10 min. The polybutene-1 is present in the present invention in an amount of from 2 to 20 parts, preferably 4 to 15 parts, based on 100 parts of (a)+(b)+(c). The ratio of the polybutene-1 to component (b) must be less than 0.5, preferably from 0.1 to 0.3.

The partial crosslinking of the composition is carried out using a peroxide curing system comprising an organic peroxide and at least one crosslinking aid selected from 1,2-polybutadiene and furan derivatives of the formula:

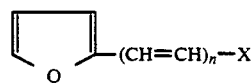

or

-continued

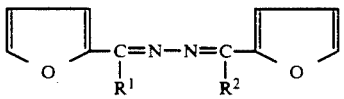

where X is a radical of the formula —CHO, —COOH, —CHONH$_2$, —CN, —NO$_2$, —CH$_2$COCH$_2$COOR, —CH(COOR)$_2$, where R is an aryl containing 6–8 carbon atoms, or an alkyl containing 1–4 carbon atoms, n is 1 or 2, R$^1$ and R$^2$, same or different, are hydrogen, alkyl containing 1 to 4 carbon atoms or cycloalkyl containing 5 to 8 carbon atoms.

The peroxide crosslinking agent must have a half-life of 3.3 to 20 minutes, preferably 7 to 18 minutes, at 160° C. in ethylene-propylene-diene monomer rubber (EPDM). Suitable examples of peroxides used in the present invention include 1,1'-bis(t-butylperoxyl)diisopropyl benzene, dicumyl peroxide, n-butyl-4,4'-bis(t-butylperoxy)valerate, and 2,5-di-(t-butyl-peroxy)-2,5-dimethylhexane. The peroxide is present in an amount, based on 100 parts of (a)+(b)+(c), of from 0.5 to 3 parts, preferably, from 1 to 2.5 parts, in liquid or solid supported form and are commercially available.

The 1,2-polybutadiene has a molecular weight of at least 1,300 to about 13,000, preferably, at least 2,400 to 13,000. The 1,2-vinyl content is at least 50%, and preferably 50 to 90%, and most preferably 70 to 90%. The amount of 1,2-polybutadiene present is from 2 to 20 parts, preferably 4 to 12 parts, based on 100 parts of (a)+(b)+(c). The 1,2-polybutadiene can be used in the liquid or solid supported form and is commercially available in both forms.

The furan derivatives of the formula described above that can be used in the present invention are known in the art and can be prepared according the method described in U.S. Pat. No. 2,738,338 which method is incorporated herein by reference. Suitable examples include 1,5-difurfuryl-1,4-pentadiene-3-one, difurfuralaldzene, β(α-furyl)acrolein, 5-(α-furyl)pentadienal, α-furylacrylamide, α-furylacrylonitrile, β-(α-furyl)acrylic acid and its esters, esters of furfurylidene and the like. The furan derivatives are used in an amount of from 0.15 to 3, preferably 0.17 to 2 parts based on 100 parts of (a)+(b)+(c).

The dynamically partially cured thermoplastic elastomers according to the present invention are obtained by adding the peroxide curing system to a mixture of components (a), (b), (c), and (d), and subjecting said mixture to curing conditions while masticating the mixture to bring about the desired dynamic partial cure.

Components (a), (b), and (c) form a homogeneous blend prepared by first polymerizing propylene to form component (a) and then polymerizing propylene and ethylene in the presence of component (a) to form components (b) and (c) in a single or series of reactors in liquid or gas phase or in liquid-gas phase in at least two stages. In the alternative, components (a), (b), and (c) can each be prepared separately and then mixed by melt-kneading.

The term "partially cured", as referred to herein, means that the degree of curing, in terms of the gel content, is at least 80% and no more than 94% in cyclohexane according to the test set forth herein below. Preferably, the gel content is from 85 to 92%.

The mixing and/or mastication temperature is between 160° C. and 225° C., preferably 180° C. and 215° C., for a period of about 2 to 30 minutes, preferably 3 to 20 minutes, to bring about the dynamically partially cured thermoplastic elastomer of the present invention. At the above curing conditions at least 97% of the curing agent is depleted, generally 98 to 99%, based on the theoretical half-life at 160° C. in EPDM. The mastication or shearing process can be carried out on an open roll, in an internal mixer (e.g., Banbury or Haake mixers), and single-screw or twin-screw extruders.

In preparing the thermoplastic elastomer of the present invention, a homogeneous blend of components (a), (b) and (c) is prepared in two stages as described above, wherein the first stage is in liquid propylene and the second stage is in gas phase using a catalyst and procedure as set forth U.S. Ser. No. 515,936, filed Apr. 27, 1990, the disclosures of which are incorporated herein by reference. The homogeneous blend thus obtained is added to component (d) and mixed until a homogeneous mixture is formed. The crosslinking aid, a furan derivative as described above or 1,2-polybutadiene, is then added and mixing is continued for approximately 1 to 2 minutes. The 1,2-polybutadiene can be used in liquid or solid form. When the 1,2-polybutadiene is added as a liquid, it is generally added in small increments of 25 to 50% over a period of 2 to 6 minutes and when added as a solid, it is generally added all at one time. Then the peroxide is added and mixed until there is no change in viscosity, about 5 to 7 minutes, indicating that substantially all the peroxide has been used. The mastication is then continued for an additional 1 to 2 minutes.

Preferably, the thermoplastic elastomer of this invention is prepared by premixing all of the components. According to this method all of the components are premixed by tumble blending, e.g. in a Henschel mill or a V-blender. The premix is then charged to the chamber of a high intensity mixer, mixed until fluxed and constant viscosity is obtained, approximately 1 to 3 minutes, and mastication is continued for additional 1 to 2 minutes.

In addition, the curing system may further contain other coagents, such as, phenylene-bis-maleimide and/or sulfur donors, such mercaptobenzothiazole, benzothiazyldisulfide, tetramethylthiuram monosulfide, tetramethylthiuramdisulfide, dipentamethylenethiuram hexasulfide, N,N'-diethylthiourea, amylphenol disulfide and zinc dibutyldithiocarbamate. The amount of other coagent used is in the range of 0.5 to 3 parts, preferably 1 to 2.5, and the amount of sulfur donor is in the range of about 0.15 to 3, preferably 0.17 to 2, parts, based on 100 parts of (a)+(b)+(c). The sulfur donors and the phenylene-bismaleimide used in this invention are commercially available.

When the curing system contains an additional coagent and/or sulfur donor, the coagent is generally added along with the 1,2-polybutadiene and the sulfur donor is generally added in combination with the peroxide.

In addition to the above major components, an antioxidant is generally present in the thermoplastic elastomer in an amount of from 0.1 to 0.9 parts, based on 100 parts of (a)+(b)+(c). Suitable examples of antioxidants used in this invention are thiophenols, 4,4'-thio-bis-(6-t-butyl-m-cresol); phosphites, trisnonylphenyl phosphite; phenolic esters, tetrakismethylene-3(3,5'-di-t-butyl-4'-hydroxyl-propionate)-methane; thiodipropionates, dilaurylthiopropionate; hydroquinones, 2,5-di-t-butyl-hydroquinones; and quinolines, 2,2,4-trimethyl-1,2-dihydroquinoline all commercially available.

Also the thermoplastic elastomer of the present invention may contain other conventional additives, for example, extender oils, such as paraffinic and naphthenic oils, in an amount of from 20 to 100 parts, preferably 25 to 60, and more preferably 25 to 50, based on 100 parts of ethylene-propylene rubber; or zinc oxide, in an amount of from 2 to 6 parts, based on 100 parts of (a)+(b)+(c).

The antioxidant, as well as, any other conventional additives, such as zinc oxide or additional antioxidants, are added before the peroxide is added. When the thermoplastic elastomer is prepared by the premixed method, the extender oil is generally added after the premix is charged to the mixer and fluxing of the ingredients has begun.

The present invention will be illustrated in greater detail with reference to the examples of the invention set forth below. The physical properties in the following working examples and comparative examples were measured in the following manner.

| | |
|---|---|
| Tensile Strength | ASTM D-412 |
| Break Elongation | ASTM D-412 |
| 100% Modulus | ASTM D-412 |
| 200% Modulus | ASTM D-412 |
| Shore D Hardness | ASTM D-2240 |
| Compression Set | ASTM D-395, Method B |
| Melt Flow I10 | ASTM D-1283 @ 230° C., 10 kg. wt. |

Percent gel content is determined by soaking a weighed 1.5 inch by 0.75 inch by 0.080 inch test specimen in about 100 ml of cyclohexane at about 23° C. for 48 hours, removing the sample and drying to constant weight (about 72 hours) in a vacuum oven at 80° C. The % gel was calculated as:

$$\% \text{ gel} = \frac{\text{Initial wt. of rubber} - \text{Wt. of rubber extracted}}{\text{Initial wt. of rubber (in sample)}} \times 100\%$$

EXAMPLE 1

This example illustrates the partially cured thermoplastic elastomer of this invention and a method of preparing same.

To a blend of about 40 parts crystalline polypropylene having an isotactic index of about 92, about 40 parts ethylene-propylene copolymer rubber having an ethylene content of about 50%, and 20 parts semi-crystalline, low density, essentially linear ethylene-propylene copolymer which is insoluble in xylene at room temperature and has an ethylene content of 96% prepared as described herein above, in a Henschel mill is added 6 parts polybutene, 5.5 parts 1,2-polybutadiene, 4.2 parts 1,1'-bis(t-butylperoxy)diisopropylbenzene, 6 parts zinc oxide, 0.7 parts mercaptobenzothiazole, 2 parts N,N'-phenylene-bis-melamide and 0.3 parts 4,4'-thio-bis-(6-t-butyl-m-cresol), and the ingredients are tumbled blended for approximately 15 to 30 seconds. The tumble blended mix is then charged to a Haake internal mixing head (model 600E) which is preset at a temperature of 182° C. and mixed for approximately 1 to 3 minutes at said temperature. 5 parts of oil is added and mixing continued for 30 to 60 seconds, then the remaining 5 parts of oil is added. Mixing is continued for an additional 45 to 70 seconds and then 0.4 parts tetrakis[methylene(3,5-di-tert-butyl-4-hydroxy-hydrocinnamate)]methane is added. Mixing is continued until a homogeneous mixture is obtained.

The mixture is then transferred onto compression mold bottom plattens, covered with top plattens and compression molded at 215° C. for 3 minutes at 15 tons pressure. The plattens are removed from the hot press and placed in a room temperature press and cooled under 15 tons pressure for about 15 minutes and then removed for testing.

The physical properties are set forth in Table 1.

COMPARATIVE EXAMPLE 1

30 parts polypropylene, 60 parts ethylene-propylene-ethylidene norbornene rubber having 55% ethylene, 4.4% diene, a Raw Mooney Viscosity 70, commercially available, and 10 parts linear low density polyethylene having a density of 0.930 and melt index of 1.0, commercially available, are introduced into a Haake internal mixer and mixed for approximately 2 minutes until fluxed at 187° C. to 193° C. 1.25 parts dicumyl-peroxide is added and mixing continued for approximately 6 minutes. Then 0.1 parts of 4,4'-thio-bis-(6-t-butyl-m-cresol) is added and mixed for an additional 1-2 minutes. The partially crosslinked thermoplastic elastome obtained had a gel content 94.7%.

100 parts of the partially crosslinked thermoplastic elastomer prepared above is added to 25 parts of polybutene-1 and mixed for approximately 2-3 minutes at a temperature of 190° C.

Compression molding samples are prepared according to the procedure of Example 1. The physical properties are set forth in Table 1.

TABLE I

| Ingredients | Ex. 1 | Comp. Ex. 1 |
|---|---|---|
| Polypropylene | 40 | 30 |
| Ethylene-Propylene Copolymer Rubber | 40 | 60 |
| Ethylene-Propylene Copolymer | 20 | — |
| Linear Low Density Polyethylene | — | 10 |
| Polybutene-1 | 6 | 25 |
| Peroxide(1) | 4.2 | — |
| Peroxide(2) | — | 1.25 |
| 1,2-Polybutadiene | 5.5 | — |
| ZnO | 6.0 | — |
| N,N'-Phenylene-bis-melamide | 2.0 | — |
| 4,4'-thio-bis-(6-t-butyl-m-cresol) | 0.3 | 0.1 |
| Mercaptobenzothiazole | 0.7 | — |
| Tetrakis[methylene(3,5-ti-tert-butyl-4-hydroxy-hydrocinnamate)]methane | 0.4 | — |
| SUNPAR 2280(3) | 10 | — |
| Properties | | |
| 100% Modulus (psi) | 992 | 785 |
| Tensile Strength (psi) | 1600 | 1495 |
| Elongation (%) | 340 | 450 |
| Shore A | 89 | 88 |
| % Compression Set @ 100° C./22 hr. | 52 | 70 |
| I10 @ 230° C. | 14 | 10 |
| % Gel | 88.3 | 94.9 |
| PBR/Rubber Ratio | 0.16 | 0.42 |

(1)1,1'-Bis(t-butylperoxy)diisopropylbenzene commercially available.
(2)Dicumyl peroxide, commercially available.
(3)Petroleum hydrocarbon oil.

EXAMPLE 2

A dynamically partially cured thermoplastic elastomer is prepared according to the procedure and ingredients of Example 1 except that an additional 5 parts of polypropylene is used, 4 parts of polybutene-1 is used instead of 6 parts polybutene-1 and the tetrakis[methylene(3,5-di-tert-butyl-4-hydroxyhydrocinnamate)]methane is added at or around the same time as the polybutene-1 instead of after the last addition of oil. The physical properties are set forth in Table II.

EXAMPLE 3

A dynamically partially cured thermoplastic elastomer is prepared according to the procedure and ingredients of Example 2 except that 6 parts of polybutene-1 is used. The physical properties are set forth in Table II.

COMPARATIVE EXAMPLE 2

A dynamically partially cured thermoplastic elastomer is prepared according to the procedure and ingredients of Example 2 except that no polybutene-1 is used. The physical properties are set forth in Table II.

TABLE 2

| Ingredients | Ex 2 | Ex 3 | Comp. Ex. 2 |
|---|---|---|---|
| Polypropylene | 40 | 40 | 40 |
| Ethylene-Propylene Copolymer Rubber | 40 | 40 | 40 |
| Ethylene-Propylene Copolymer | 20 | 20 | 20 |
| Polybutene-1 | 4 | 6 | — |
| Profax 6501 | 5 | 5 | 5 |
| Peroxide* | 4.2 | 4.2 | 4.2 |
| 1,2-Polybutadiene | 5.5 | 5.5 | 5.5 |
| ZnO | 6 | 6 | 6 |
| N,N'-thio-bis-melamide | 2 | 2 | 2 |
| 4,4'-thio-bis(6-t-butyl-m-cresol) | 0.3 | 0.3 | 0.3 |
| Mercaptobenzothiazole | 0.7 | 0.7 | 0.7 |
| Tetrakis[methylene(3,5-di-tert-butyl-4-hydroxyhydrocinnamate)]methane | 0.4 | 0.4 | 0.4 |
| SUNPAR 2280** | 10 | 10 | 10 |
| Properties |  |  |  |
| 100% Modulus (psi) | 1156 | 1148 | 1205 |
| Tensile Strength (psi) | 1871 | 2033 | 1795 |
| Elongation (%) | 331 | 357 | 330 |
| Shore D | 38 | 38 | 38 |
| % Compression Set 100° C./22 hr. | 55 | 56 | 56 |
| $I_{10}$ @ 230° C. | 8.7 | 8.2 | 3.8 |
| % Gel | 93.3 | 91.4 | 91.9 |
| PBR/Rubber Ratio | 0.11 | 0.17 | — |

*1,1'-Bis(t-butylperoxy) diisopropylbenzene, 40% dispersion, commercially available
**Petroleum hydrocarbon oil.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A dynamically partially cured thermoplastic elastomer comprising, by weight, (a) 20 to 70 parts propylene polymer material selected from the group consisting of (i) crystalline polypropylene having an isotactic index of greater than 90% and (ii) an ethylene-propylene random copolymer having an ethylene content of up to about 10%, (b) 20 to 60 parts amorphous ethylene-propylene copolymer rubber, (c) 8 to 30 parts semi-crystalline, low density, essentially linear ethylene-propylene copolymer, xylene insoluble at room temperature, wherein the total amount of (a)+(b)+(c) is 100 parts, and (d) 2 to 20 parts of polybutene-1 based on 100 parts of (a)+(b)+(c), where the ratio of polybutene-1 to rubber is less than 0.5.

2. A dynamically partially cured thermoplastic elastomer according to claim 1, comprising 30 to 50 parts propylene polymer material.

3. A dynamically partially cured thermoplastic elastomer according to claim 2, wherein said propylene polymer material is polypropylene.

4. A dynamically partially cured thermoplastic elastomer according to claim 1, comprising 30 to 50 parts amorphous ethylene-propylene copolymer rubber.

5. A dynamically partially cured thermoplastic elastomer according to claim 1, comprising 10 to 20 parts semi-crystalline, low density, essentially linear ethylene-propylene copolymer.

6. A dynamically partially cured thermoplastic elastomer according to claim 1, comprising 4 to 15 parts polybutene-1.

7. A dynamically partially cured thermoplastic elastomer according to claim 1, comprising (a) 30 to 50 polypropylene (b) 30 to 50 parts amorphous ethylene-propylene copolymer rubber, (c) 10 to 18 parts semi-crystalline, low density, essentially linear ethylene-propylene copolymer and (d) 4 to 15 parts, based on 100 parts of (a)+(b)+(c), polybutene-1.

8. A dynamically partially cured thermoplastic elastomer according to claim 1, comprising (a) 40 parts polypropylene (b) 40 parts amorphous ethylene-propylene copolymer rubber, (c) 20 parts semi-crystalline, low density, essentially linear ethylene-propylene copolymer and (d) 2 to 6 parts, based on 100 parts of (a)+(b)+(c), polybutene-1.

* * * * *